(12) United States Patent
Dhainaut

(10) Patent No.: US 6,999,760 B2
(45) Date of Patent: Feb. 14, 2006

(54) FREQUENCY REUSE SCHEME AND CORRESPONDING FREQUENCY HOPPING SEQUENCE

(75) Inventor: Chagny Dhainaut, Paris (FR)

(73) Assignee: Alcatel, Paris (FR)

( * ) Notice: Subject to any disclaimer, the term of this patent is extended or adjusted under 35 U.S.C. 154(b) by 483 days.

(21) Appl. No.: 10/152,802

(22) Filed: May 23, 2002

(65) Prior Publication Data

US 2003/0119517 A1 Jun. 26, 2003

(30) Foreign Application Priority Data

Jul. 12, 2001 (EP) .................................. 01440219

(51) Int. Cl.
*H04Q 7/20* (2006.01)
(52) U.S. Cl. .................... 455/422.1; 455/446; 455/447
(58) Field of Classification Search ............. 455/422.1, 455/446, 447, 450, 452.1, 561; 375/132–135, 375/137, 138; 370/328, 330, 334, 436
See application file for complete search history.

(56) References Cited

U.S. PATENT DOCUMENTS

| | | | |
|---|---|---|---|
| 5,459,759 A | 10/1995 | Schilling | |
| 5,619,493 A | 4/1997 | Ritz et al. | |
| 5,649,292 A | 7/1997 | Doner | |
| 5,844,894 A | 12/1998 | Dent | |
| 5,850,608 A * | 12/1998 | Faruque | 455/447 |
| 6,181,918 B1 * | 1/2001 | Benveniste | 455/63.2 |
| 6,212,385 B1 | 4/2001 | Thomas et al. | |

FOREIGN PATENT DOCUMENTS

EP 1028599 A2 8/2000

* cited by examiner

*Primary Examiner*—Jean Gelin
(74) *Attorney, Agent, or Firm*—Sughrue Mion, PLLC

(57) ABSTRACT

A cell of a wireless radio communication network is divided in N substantially identical sectors S1, S2, . . . , SN looking out from a base station. Sector Si is contiguous to sectors Si−1 and Si+1 for $2 \leq i \leq N-1$. N frequencies $f1<f2< \ldots <fN$ are available for transmitting signal from the base station to radio terminals located in the cell. At a predefined time slot, the frequency used in the sectors S1, . . . , SN respectively is the following: f1; f3; f5; . . . ;f2n−1; f2; f4; f6 . . . ; f2n; if N=2n, or f1; f3; f5; . . . ; f2n−1; f2n+1; f2; f4; f6 . . . ; f2n; if N=2n+1. The frequency used in the sectors at any subsequent time slot is a cyclic permutation of the previous sequence.

10 Claims, 3 Drawing Sheets

FREQUENCY REUSE SCHEME AND CORRESPONDING FREQUENCY HOPPING SEQUENCE

BACKGROUND OF THE INVENTION

The present invention relates to a wireless cellular communications and more particularly to a frequency reuse scheme and a corresponding frequency hopping scheme in an hexagonal wireless cellular communication network.

In a wireless cellular communication network, a limited number of frequencies are available for communicating. Each frequency must be reused in different cells of the network causing interference between different users using the same frequency. An appropriate frequency reuse scheme should be applied in the network to reduce the interference and optimize the network capacity.

For example, in a network having hexagonal cells, a simple frequency reuse scheme using seven different frequencies consists in repeating the pattern as shown on FIG. 1 in the whole network. A first base station at the center of an hexagonal cell C1 supplies the whole cell with signals at the frequency f1. This is ensured by a omni-directional antenna at the center of the cell. Six further hexagonal cells C2, ..., C7 are surrounding the cell C1. Signals at the frequencies f2, ..., f7 are respectively supplied in the cells C2, ..., C7. This pattern P1 using seven frequencies is repeated to pave the whole network.

In order to increase the capacity of the network, in particular in urban areas, it is appropriate to subdivide each hexagonal cell in a plurality of sectors, each sector being allocated one of the available frequencies. For example, an hexagonal cell may be subdivided in six 60° angular sectors each comprising a directional antenna. If six frequencies are available in the network, each frequency will be used once in one sector of each cell. Known patterns are disclosed for example in U.S. Pat. No. 5,459,759.

Moreover, frequency hopping can be implemented to further optimize the network. Frequency hopping consists in changing the frequency used in the different sectors of the cell at regular time intervals, called the hop duration. Of course, the frequency hopping scheme must be controlled in the cells and coordinated so that no sector in the some cell use the same frequency at the same time the distance between two sectors of different cells using the same frequency at the same time must be kept high enough to minimize interference.

FIG. 2 is a representation of a known frequency hopping scheme used in an hexagonal cell subdivided in six 60° angular sectors. For this purpose six different frequencies are used. In this representation, the frequencies indicated in each concentric circle CC0, ..., CC5 correspond to the frequency used in the corresponding sector during one time slot. This concentric circle CC0 corresponds to time slot T mod(6), CC1 to time slot T+1 mod(6), CC2 to time slot T+2 mod(6), CC3 to time slot T+3 mod(6), CC4 to time slot T+4 mod(6) and CC5 to time slot T+5 mod(6). Indeed, the indicated frequency hopping sequences are repetitively used for transmitting signals in the different sectors.

On FIG. 2, the sequences used in the different sectors are the following:

for sector S1: frequency hopping sequence f1; f3; f5; f2; f6; f4;

for sector S2: frequency hopping sequence f5; f1; f3; f6; f4; f2;

for sector S3: frequency hopping sequence f3; f5; f1; f4; f2; f6;

for sector S4: frequency hopping sequence f6; f2; f4; f1; f5; f3;

for sector S5: frequency hopping sequence f2; f4; f6; f3; f1; f5;

for sector S6: frequency hopping sequence f4; f6; f2; f5; f3; f1.

The frequency hopping scheme presented in this document is however presenting interference higher than a predefined level in 13% of the whole cell area.

A particular object of the present invention is to provide a frequency reuse scheme and a corresponding frequency hopping scheme adopted to minimize the amount of interference experienced in a wireless cellular communication network having cells subdivided in N identical sectors.

Another object of the invention is to provide a transmitter able to generate signal in accordance with a frequency reuse scheme and a corresponding frequency hopping scheme.

SUMMARY OF THE INVENTION

These objects, and others that appear below, are achieved by a frequency hopping scheme used by a base station located in a cell of a wireless radio communication network, said cell being divided in N substantially identical sectors S1, S2, ..., SN looking out from said base station, sector Si being contiguous to sectors Si−1 and Si+1 for $2 \leq i \leq N-1$ and sector S1 being contiguous to sector SN, N frequencies f1<f2< ... <fN being available for transmitting signals from said base station to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein, at a predefined time slot, the frequency used in said sectors S1, ..., SN respectively are the following:

$f1; f3; f5; \ldots; f2n-1; f2; f4; f6; \ldots; f2n$; if $N=2n$ or $f1; f3; f5; \ldots; f2n-1; f2; f4; f6; \ldots; f2n-2$; if $N=2n-1$;

the frequency used in said sectors at any subsequent time slot being a cyclic permutation of the previous sequence.

These objects are further achieved by a transmitter to be used in a wireless radio communication network, said transmitter being located in a cell divided in N substantially identical sectors S1, S2, ..., SN looking out from said transmitter, sector Si being contiguous to sectors Si−1 and Si+1 for $2 \leq i \leq N-1$ and sector Si being contiguous to sector SN, N frequencies f1<f2< ... <fN being available for transmitting signal from said transmitter to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein said transmitter comprises means for generating signals in the different sectors S1, ... SN respectively having said frequency:

$f1; f3; f5; \ldots; f2n-1; f2; f4; f6; \ldots; f2n$; if $N=2n$ or $f1; f3; f5; \ldots; f2n-1; f2; f4; f6; \ldots; f2n-2$; if $N=2n-1$;

the frequency used in said sectors at any subsequent time slot being a cyclic permutation of the previous sequence These objects are further attained by a wireless radio communication system comprising a plurality of base stations arranged to form hexagonal cells, said cells being divided in N substantially identical sectors S1, S2, ..., SN looking out from said base station, sector Si being contiguous to sectors Si−1 and Si+1 for 2≦i≦N−1 and sector S1 being contiguous to sector SN, N frequencies f1<f2< ... <fN being available for transmitting signal from said base station to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein one of said base station comprises means for generating signals in the different sectors S1, ..., SN respectively having said frequency:

f1; f3; f5; ...; f2n−1; f2; f4; f6; ...; f2n; if N=2n or f1; f3; f5; ...; f2n−1; f2; f4; f6; ...; f2n−2; if N=2n−1;

the frequency used in said sectors at any subsequent time slot being a cyclic permutation of the previous sequence.

The present invention has the advantage to ensure continuously a channel separation of a minimum of 2*DeltaF between two adjacent sectors and a separation of 2*DeltaF between two consecutive time slots where DeltaF represents a predefined frequency distance between two adjacent frequencies in the wireless cellular network. The prior art solutions ensured only a minimum of DeltaF between two consecutive sectors or between two consecutive time slots.

As a consequence, the signal sent in two consecutive sectors or in two consecutive time slots is submitted to less interference: intra-cell interference is reduced as well as inter-cell interference. Indeed, the frequency reuse scheme associated to the frequency hopping scheme according to the present invention reduces the interference area to 6% of the cell surface compared to 13% at least for other prior art frequency reuse and frequency hopping scheme when applied to a cell divided in six 60° sectors.

Further advantageous features of the invention are defined in the dependent claims.

This invention is based on a priority application EP 01 44 0219 which is hereby incorporated by reference.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
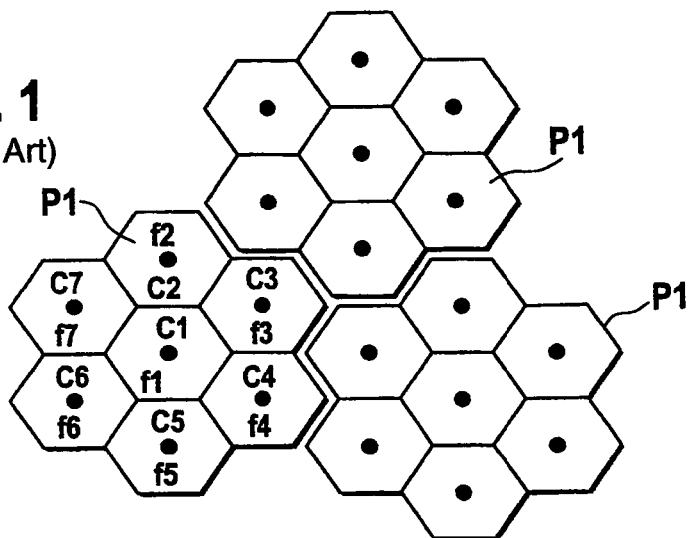
FIG. 1 shows a simplified wireless cellular communication network with frequency reuse (prior art)
Figure 2:
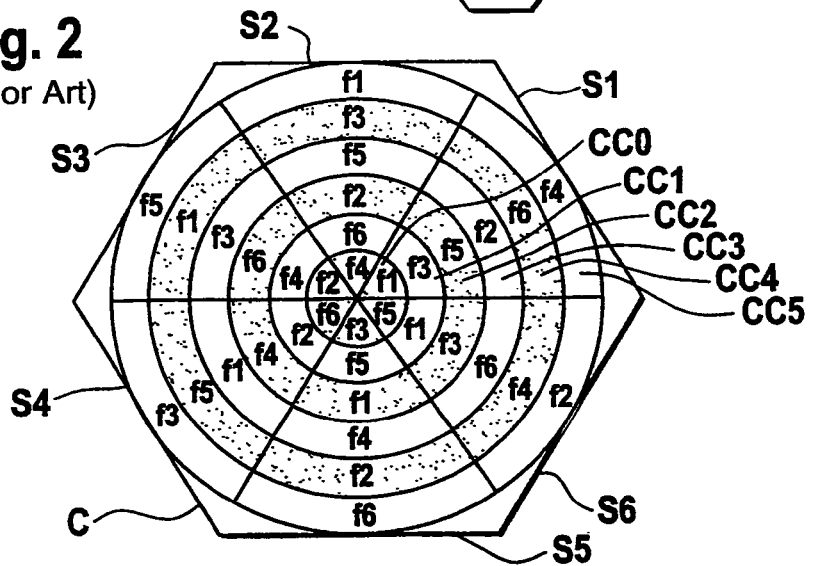
FIG. 2 illustrates a known frequency reuse and a corresponding frequency hopping scheme (prior art)

FIGS. 1 and 2 have already been described in relation with prior art.

FIG. 3 illustrates the frequency reuse and frequency hopping scheme according to the present invention. For sake of simplicity, the invention will be in the following illustrated when applied to hexagonal cells, divided in six 60° sectors. It will, however, be clear for a person skilled in the art how to extend this description to any cell divided in any number of sectors as claimed in the broadest scope of the invention.

Figure 3A:
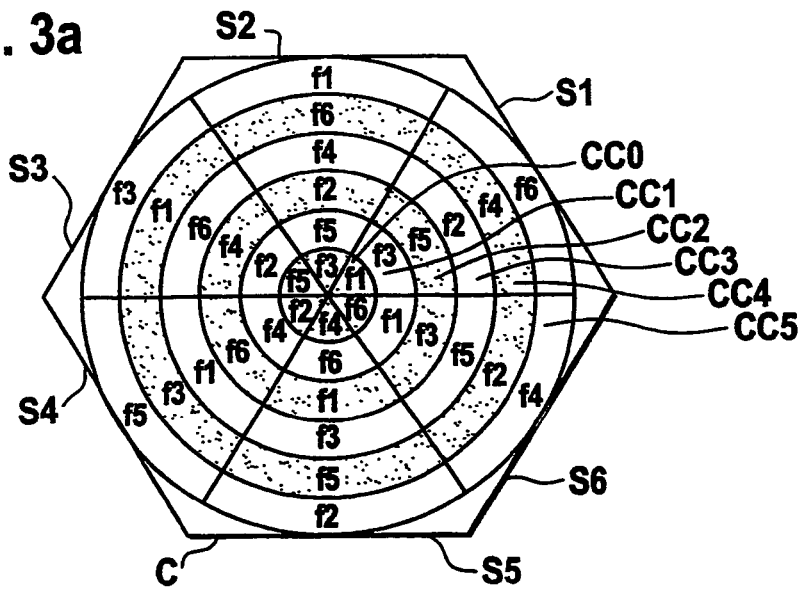
FIGS. 3a and 3b illustrates the frequency reuse and frequency hopping scheme according to the present invention.

FIG. 3a represents an hexagonal cell C subdivided in six 60° angular sectors S1, ..., S6 supplied by six different available frequencies f1, ..., f6.

In this representation, the frequencies indicated in each concentric circle CC0, ..., CC5 correspond to the frequency used in the corresponding sector during a specific time slot.

The concentric circle CC0 corresponds to the frequencies used in the different sectors S1, ..., S6 during time slot T mod(6).

Concentric circle CC1 corresponds to the frequencies used in the different sectors during time slot T+1 mod(6), CC2 corresponds to the frequencies used in the different sectors during time slot T+2 mod(6), ..., and concentric circle CC5 corresponds to the frequencies used in the different sectors during time slot T+5 mod(6). Then, any circle radius can be seen as a time axis.

According to the present invention, the sequences used in the different sectors during six consecutive time slots are the following:

for sector S1: frequency hopping sequence f1; f3; f5; f2; f4; f6;

for sector S2: frequency hopping sequence f6; f1; f3; f5; f2; f4;

for sector S3: frequency hopping sequence f4; f6; f1; f3; f5; f2;

for sector S4: frequency hopping sequence f2; f4; f6; f1; f3; f5;

for sector S5: frequency hopping sequence f5; f2; f4; f6; f1; f3;

for sector S6: frequency hopping sequence f3; f5; f2; f4; f6; f1.

Where f1<f2<f3<f4<f5<f6.

The indicated frequency hopping sequences are repetitively used every six time slots for transmitting signals in the different sectors.

Viewed in a synthetic manner, this correspond to the use of the frequencies f1; f3; f5; f2; f4; f6 respectively in sectors S1, S2, S3, S4, S5, S6 at a predefined time slot for example time slot T0 and rotating the frequency sequence by one sector for each consecutive time slots i.e. at time slot T1, this correspond to the use of the frequencies f3; f5; f2; f4; f6; f1 respectively in sectors S1, S2, S3, S4, S5, S6, at time slot T2 this correspond to the use of the frequencies f5; f2; f4; f6; f1; f3 respectively in sectors S1, S2, S3, S4, S5, S6 and so on.

Figure 3B:
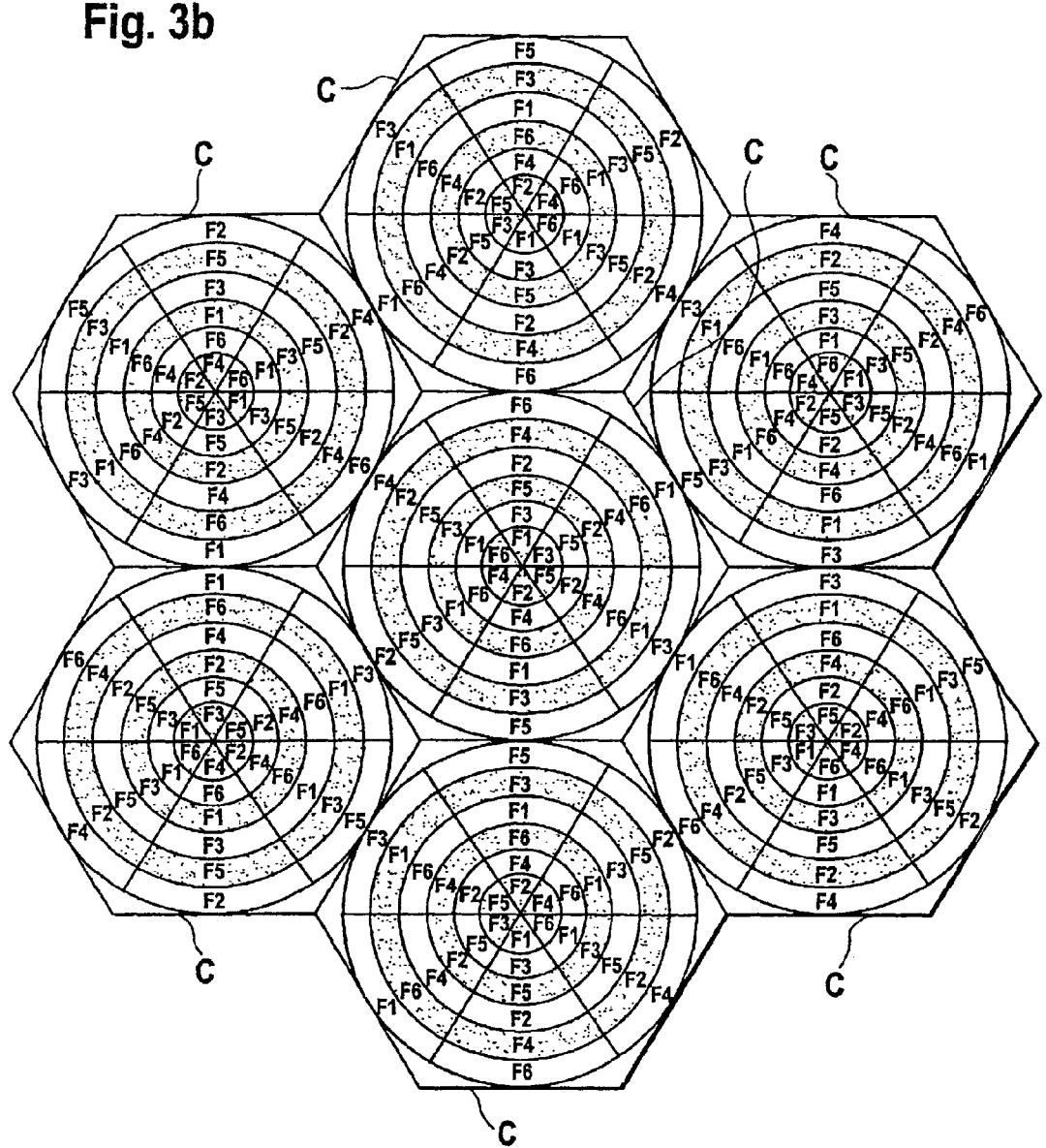

FIG. 3b represents the frequency hopping scheme according to the present invention at the scale of several cells C of a wireless radio communication network.

Figure 4:
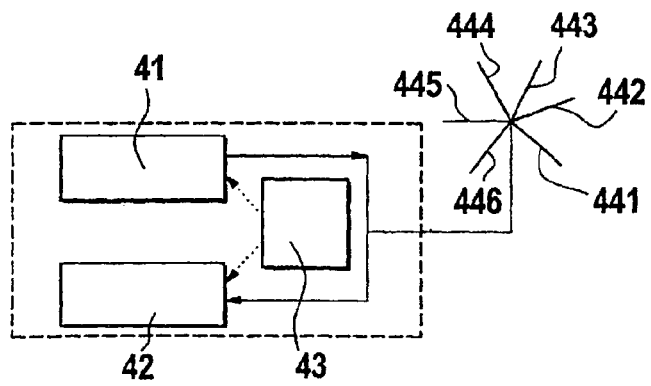
FIG. 4 illustrates a base station according to the present invention.

FIG. 4 represents a base station supporting a frequency reuse and hopping scheme according to the present invention dedicated to communicate with radio terminals which may be mobile or in a fixed, stationary location. Signals exchanged between the radio terminals and the base station include, but are not limited to, digitized voice, computer data, facsimile data, video data, etc. The base station may communicate in a point to point modus or in a broadcast modus as well as using Time Division Multiple Access (TDMA), Code Division Multiple Access (CDMA) techniques or a combination of both for controlling the access of multiple users to the air interface.

The base station comprises a signal modulation module 41 and a signal demodulation module 42, a sector and frequency sequence control module 43, and six directional antennas 441, . . . , 446 each covering an angular sector of 60°.

The signal modulation module is responsible for generating a signal modulated with a predefined modulation required for communicating in the wireless communication network. Modulation may be based on frequency shift keying (FSK), phase shift keying (PSK) or any well known modulation for a person skilled in the art.

The signal modulation module is controlled by the sector and frequency control module 43 in order to indicate which frequencies should be used for modulating the signal. This frequency depends on the time slot and on the sector to which this signal is destined. The specific frequency sequences according to the present invention are stored in the sector and frequency sequence control module 43. Moreover, a lookup dynamic table is also stored in the sector and frequency sequence control module 43. This table associates each radio terminal in the cell currently communicating with the network to the sector in which this radio terminal is located. Moreover, a clock enables the sector and frequency sequence control module 43 to knows which is the current time slot.

As a consequence, the sector and frequency sequence control module 43 continuously knows which frequency should be used for modulating the signal destined to any radio terminal and forwards this information to the signal modulation module 41.

In reception (uplink direction), the same principle may apply as in downlink.

In a preferred embodiment of the present invention, the base station further comprises means for superposing several layers of frequencies in a single cell. For this purpose, several non-overlapping sets of six frequencies are available. Each layer being exclusively supplied with frequencies belonging to one set of frequencies. If the different sets of frequencies are belonging to frequency bonds distant enough from each other, the signals transmitted in the different layers do not interfere with each other. This embodiment has the advantage to further increase the capacity of a wireless radio communication network according to the present invention.

In a preferred embodiment of the invention, the frequency reuse and hopping scheme is used in a fixed-wireless network i.e. for wireless radio communication with fixed radio terminals as for example in a LMDS (Local Multipoint Distribution Services) network or for Wireless Local Loop applications. For this application, the frequencies used for this application are in the band of 3.5 GHz and preferably separated by a predefined frequency distance equals to 4 MHz.

Figure 5B:
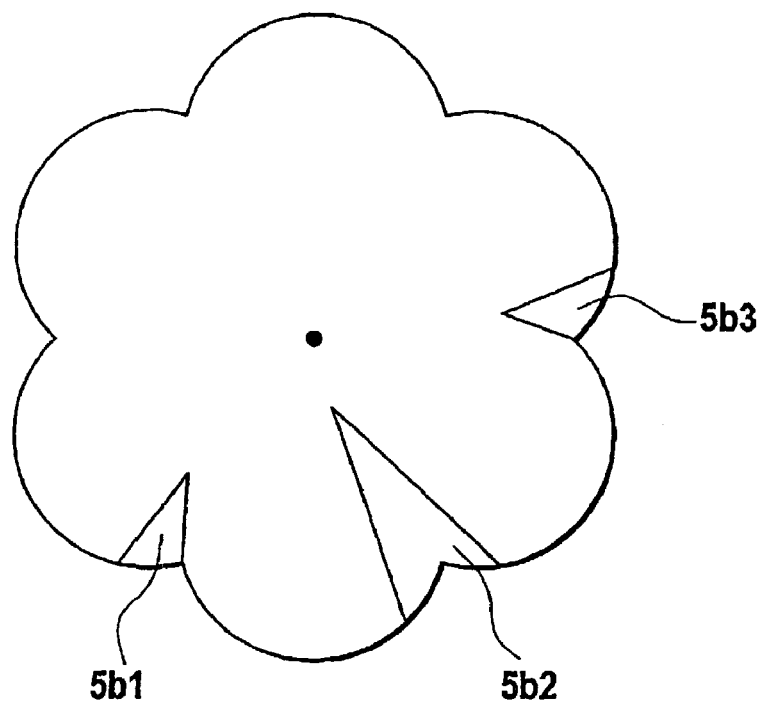
FIGS. 5a and 5b represents a simulation of intra-cell interference and a comparison between the interference area in a cell of a wireless cellular network when implementing frequency reuse and hopping scheme described in FIG. 2 (FIG. 5a) and when implementing the present invention (FIG. 5b).
Figure 5A:
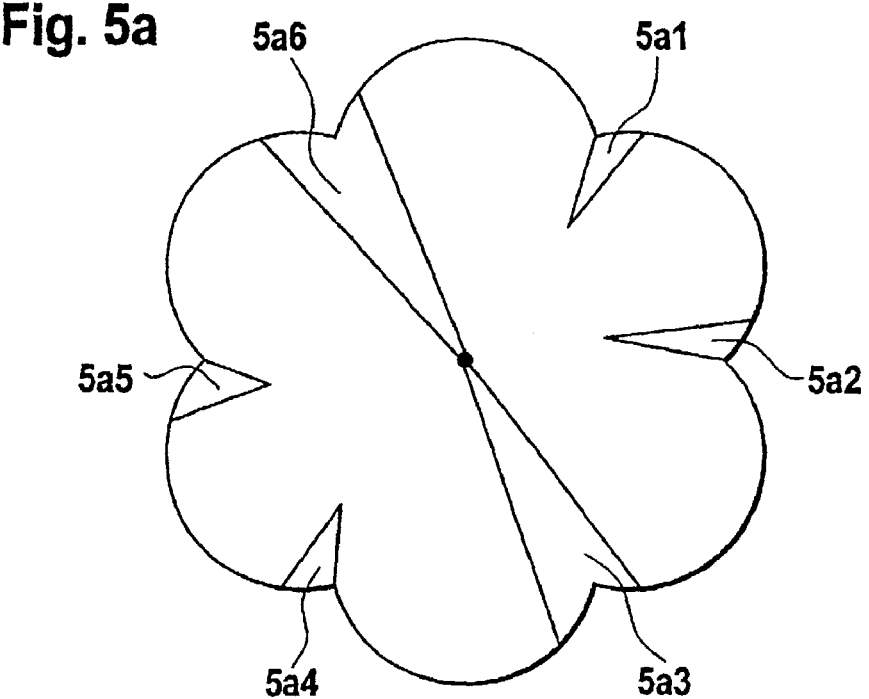

FIGS. 5a and 5b represents a simulation of intra-cell interference and a comparison between the interference area in a cell of a wireless cellular network when implementing frequency reuse and hopping scheme described in FIG. 2 (FIG. 5a) and when implementing the present invention (FIG. 5b).

The interference have been simulated with the ICS Telecom tool in the following conditions:
   Fixed terminals
   60° sector antennas in the base stations
   Directive antennas at the user terminals
   Flat earth
   Regular pattern The calculation is done according to "best server+interference" using the C/I method The following frequencies have been considered for the simulation f1=3551 MHz, f2=3553 MHz, f3=3555 MHz, f4=3557 MHz, f5=3559 MHz, f6=3561 MHz.

In FIG. 5a, the interference areas 5a1, . . . , 5a6 represents 13% of the whole cell area. In FIG. 5b, the interference areas 5b1, . . . , 5b3 represent advantageously only 6% of the whole cell area.

What is claimed is:

1. Frequency hopping scheme used by a base station located in a cell of a wireless radio communication network, said cell being divided in N substantially identical sectors S1, S2, . . . , SN looking out from said base station, sector Si being contiguous to sectors Si−1 and Si+1 for $2 \leq i \leq N-1$ and sector S1 being contiguous to sector SN, N frequencies f1<f2< . . . <fN being available for transmitting signals from said base station to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein, at a predefined time slot, the frequency used in said sectors S1, . . . , SN respectively are the following:

$f1; f3; f5; \ldots; f2n-1; f2; f4; f6; \ldots; f2n$; if $N=2n$ or $f1; f3; f5; \ldots; f2n-1; f2; f4; f6; \ldots; f2n-2$; if $N=2n-1$;

the frequency used in said sectors at any subsequent time slot being a cyclic permutation of the previous sequence, wherein the frequencies used in each sector are in an ordered sequence, and wherein for each sector, the frequency used in each time slot is based on said ordered sequence.

2. Frequency hopping scheme according to claim 1, wherein for each successive time slot, the sequence of frequencies is rotated by one sector.

3. Frequency hopping scheme according to claim 1, wherein said cell is divided in six 60° sectors looking out from said base station, six adjacent frequencies f1<f2<f3<f4<f5<f6 being available for transmitting signals from said base station to radio terminals located in said cell, at a predefined time slot, the frequency sequence used respectively in said sectors S1, . . . , S6, at a predefined time slot, being:

f1; f3; f5; f2; f4; f6, said frequency sequence being rotated by one sector for each successive time slot.

4. Frequency hopping scheme according to claim 1, wherein each pair of adjacent frequencies are separated by a predefined frequency distance (deltaF).

5. Frequency hopping scheme according to claim 4, wherein said predefined frequency distance (delta F) equals 4 MHz.

6. Transmitter to be used in a wireless radio communication network, said transmitter being located in a cell divided in N substantially identical sectors S1, S2, . . . , SN looking out from said transmitter, sector Si being contiguous to sectors Si−1 and Si+1 for $2 \leq i \leq N-1$ and sector S1 being contiguous to sector SN, N frequencies f1<f2< . . . <fN being available for transmitting signal from said transmitter to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein said transmitter comprises means for generating signals in the different sectors S1, ..., SN respectively having said frequency:

$f1; f3; f5; \ldots; f2n-1; f2; f4; f6; \ldots; f2n$; if $N=2n$ or $f1; f3; f5; \ldots; f2n-1; f2; f4; f6; \ldots; f2n-2$; if $N=2n-1$ at a predetermined time slot;

the frequency used in said sectors at any subsequent time slot being a cyclic permutation of the previous sequence, wherein the frequencies used in each sector are in an ordered sequence, and wherein for each sector, the frequency used in each time slot is based on said ordered sequence.

7. Transmitter according to claim 6, further comprising means for superposing at least two layers of frequencies in said cell.

8. Transmitter according to claim 6, wherein it is a base station of a radio communication network.

9. Transmitter according to claim 6, used in a fixed wireless communication network.

10. Wireless communication system comprising a plurality of base stations arranged to form hexagonal cells, said cells being divided in N substantially identical sectors S1, S2, ..., SN looking out from said base station, sector Si being contiguous to sectors Si−1 and Si+1 for $2 \leq i \leq N-1$ and sector S1 being contiguous to sector SN, N frequencies f1<f2< ... <fN being available for transmitting signal from said base station to radio terminals located in said cell, the frequency used for transmitting signal in one sector of said cell being different from the N−1 other frequencies used in the subsequent N−1 sectors, said frequency used in one sector changing every time slot according to a frequency hopping scheme, wherein one of said base station comprises means for generating signals in the different sectors S1, ..., SN respectively having said frequency:

$f1; f3; f5; \ldots; f2n-1; f2; f4; f6; \ldots; f2n$; if $N=2n$ or $f1; f3; f5; \ldots; f2n-1; f2; f4; f6; \ldots; f2n-2$; if $N=2n-1$ at a predetermined time slot;

the frequency used in said sectors at any subsequent time slot being a cyclic permutation of the previous sequence, wherein the frequencies used in each sector are in an ordered sequence, and wherein for each sector, the frequency used in each time slot is based on said ordered sequence.

* * * * *